United States Patent
Naderi et al.

(10) Patent No.: US 11,814,699 B2
(45) Date of Patent: Nov. 14, 2023

(54) RECOVERY OF PRECIOUS METALS FROM COPPER ANODE SLIME

(71) Applicants: Malek Naderi, Tehran (IR); Arash Ghazitabar, Tehran (IR)

(72) Inventors: Malek Naderi, Tehran (IR); Arash Ghazitabar, Tehran (IR)

(73) Assignees: AMIRKABIR UNIVERSITY OF TECHNOLOG, Tehran (IR); Makek Naderi, Tehran (IR); Arash Ghazitabar, Tehran (IR)

( * ) Notice: Subject to any disclaimer, the term of this patent is extended or adjusted under 35 U.S.C. 154(b) by 216 days.

(21) Appl. No.: 17/207,632

(22) Filed: Mar. 20, 2021

(65) Prior Publication Data
US 2021/0207244 A1 Jul. 8, 2021

Related U.S. Application Data

(60) Provisional application No. 63/041,833, filed on Jun. 20, 2020.

(51) Int. Cl.
*C22B 11/00* (2006.01)
*C22B 7/00* (2006.01)
(Continued)

(52) U.S. Cl.
CPC ............ *C22B 11/044* (2013.01); *C01B 19/02* (2013.01); *C22B 3/065* (2013.01); *C22B 3/08* (2013.01);
(Continued)

(58) Field of Classification Search
CPC ....... C22B 11/00; C22B 11/04; C22B 11/042; C22B 11/044; C22B 11/046; C22B 3/00;
(Continued)

(56) References Cited

U.S. PATENT DOCUMENTS 3,658,510 A * 4/1972 Hoffmann ............. C22B 11/044
423/32
4,094,668 A * 6/1978 Yannopoulos .......... C22B 11/04
75/418
(Continued)

FOREIGN PATENT DOCUMENTS

CN 105794839 A * 7/2016

OTHER PUBLICATIONS

Li, XJ., Yang, HY., Jin, ZN et al. Extraction of selenium from copper anode slimes in a sealed leaching system. Russ. J. Non-ferrous Metals 58, 357-364 (2017). (Year: 2017).*

*Primary Examiner* — Vanessa T. Luk
*Assistant Examiner* — Nikolas Takuya Pullen
(74) *Attorney, Agent, or Firm* — Bajwa IP Law Firm; Haris Zaheer Bajwa

(57) ABSTRACT

A method for recovery of precious metals from copper anode slime may include leaching a leach liquor out of the copper anode slime by mixing the copper anode slime with a mixture of nitric acid and sulfuric acid, separating silver from the leach liquor by forming a silver chloride precipitate in the leach liquor by mixing a supersaturated sodium chloride solution with the leach liquor at room temperature and obtaining a first filtrate by filtering the silver chloride precipitate out of the leach liquor. Copper may be separated from the first filtrate by forming a copper hydroxide precipitate in the first filtrate by adjusting pH of the first filtrate at 9 and obtaining a second filtrate by filtering the copper hydroxide precipitate out of the first filtrate. Metallic selenium may be recovered from the second filtrate by reducing the metallic selenium via a chemical reduction utilizing L-ascorbic acid (LAA) as a reducing agent.

15 Claims, 2 Drawing Sheets

(51) Int. Cl.
    *C01B 19/02*     (2006.01)
    *C22B 3/06*     (2006.01)
    *C22B 3/08*     (2006.01)
    *C22B 15/00*     (2006.01)

(52) U.S. Cl.
    CPC .......... *C22B 7/007* (2013.01); *C22B 15/0008* (2013.01); *C22B 15/008* (2013.01)

(58) Field of Classification Search
    CPC .. C22B 3/065; C22B 3/08; C22B 3/22; C22B 3/44; C22B 15/00; C22B 15/0063; C22B 15/0065; C22B 15/0067; C22B 15/0071; C22B 15/0073; C22B 15/0084; C22B 15/0086; C22B 15/0089; C22B 7/00; C22B 7/007; C22B 7/02; C22B 7/04; C01B 19/02; Y02P 10/20
    See application file for complete search history.

(56) References Cited

U.S. PATENT DOCUMENTS

| | | | | | |
|---|---|---|---|---|---|
| 4,331,469 | A | * | 5/1982 | Kunda | .................... C22B 11/04<br>423/150.5 |
| 6,126,720 | A | * | 10/2000 | Okada | ....................... C25C 1/20<br>205/571 |

* cited by examiner

RECOVERY OF PRECIOUS METALS FROM COPPER ANODE SLIME

CROSS-REFERENCE TO RELATED APPLICATION

This application claims the benefit of priority from U.S. Provisional Patent Application Ser. No. 63/041,833, filed on Jun. 20, 2020, and entitled "RECOVERY OF PRECIOUS METALS FROM SECONDARY RESOURCES," which is incorporated herein by reference in its entirety.

TECHNICAL FIELD

The present disclosure generally relates to recovery of precious metals from secondary sources. Particularly, the present disclosure relates to hydrometallurgical recovery of silver, selenium, and copper from copper anode slime.

BACKGROUND

Copper anode slimes are metallurgical byproducts that are obtained during electrorefining of copper and may include valuable metal impurities, such as silver, gold, copper, and selenium. Such metal impurities have less electro-positivity compared to copper and may settle as slime at the bottom of a copper electrorefining cell. Electrorefining of copper is an electrolytical treatment of copper in the final stage of copper production, where impure copper anodes are refined by performing electrolysis to produce pure copper cathodes. Impure copper anodes may include the aforementioned valuable metal impurities as insoluble impurities that fall to the bottom of a copper electrorefining cell as copper anode slime. It is crucial to recover valuable metals from copper anode slime, since a significant amount of copper anode slime, more than 50,000 tons, is produced each year around the world.

Recovering valuable metals, such as gold, silver, selenium, and tellurium from anode slime may be carried out by various methods, such as pyrometallurgical and hydrometallurgical methods. In a pyrometallurgical process, copper is removed from anode slime by performing an oxidizing roast followed by sulfuric acid leaching. Oxidizing roast may be performed at elevated temperatures between 260° C. and 430° C., which may lead to higher energy consumption rates and higher costs. In addition, a pyrometallurgical process for recovery of valuable metals from a copper anode slime may not be considered an environment-friendly process due to large emissions of sulfur gas during this process. Consequently, hydrometallurgical methods may be preferred because of reduced energy consumptions and being more environment-friendly compared to pyrometallurgical processes. A hydrometallurgical process for recovery of valuable metals from a copper anode slime may include a leaching step that introduces the valuable metals into an aqueous environment followed by solvent extraction, precipitation, and chemical reduction steps that may allow for separating and recovering the valuable metals from anode slime without a need for high amounts of energy.

Consequently, developing a hydrometallurgical process that may allow for a full recovery of all valuable metals from copper anode slime in a cost-effective and environment-friendly manner is needed.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a method for recovery of precious metals from copper anode slime. An exemplary method may include leaching a leach liquor out of the copper anode slime by mixing the copper anode slime with an acid mixture with a ratio of between 1:5 and 1:20 (mass of anode slime in grams:total volume of a mixture of the copper anode slime and the acid mixture in milliliters). An exemplary acid mixture may include nitric acid and sulfuric acid. An exemplary method may further include separating silver from the leach liquor by forming a silver chloride precipitate in the leach liquor by mixing a supersaturated sodium chloride solution with the leach liquor at room temperature and obtaining a first filtrate by filtering the silver chloride precipitate out of the leach liquor. An exemplary method may further include separating copper from the first filtrate by forming a copper hydroxide precipitate in the first filtrate by adjusting pH of the first filtrate at 9 and obtaining a second filtrate by filtering the copper hydroxide precipitate out of the first filtrate.

An exemplary method may further include recovering metallic selenium from the second filtrate by forming a reaction mixture by adding L-ascorbic acid (LAA) powder to the second filtrate at room temperature, obtaining a first precipitate by adjusting pH of the reaction mixture at a value between 3 and 4, and washing the first precipitate with a nitric acid solution by mixing the first precipitate with the nitric acid solution.

In an exemplary embodiment, adjusting the pH of the first filtrate may include adding a sodium hydroxide solution to the first filtrate in a dropwise manner at room temperature. In an exemplary embodiment, adjusting the pH of the reaction mixture may include adding a sulfuric acid solution to the reaction mixture in a dropwise manner while stirring the reaction mixture.

In an exemplary embodiment, adjusting the pH of the first filtrate may include adding a sodium hydroxide solution with a concentration between 0.1 M and 1 M to the first filtrate in a dropwise manner while stirring the first filtrate.

In an exemplary embodiment, forming the copper hydroxide precipitate in the first filtrate further may include stirring the sodium hydroxide solution with the first filtrate for at least 1 hour responsive to the pH of the first filtrate adjusted to 9.

In an exemplary embodiment, forming the reaction mixture may include adding L-ascorbic acid (LAA) powder to the second filtrate with an amount of the LAA powder equal to 1.5 to 2 times a mass of selenium in the leach liquor.

In an exemplary embodiment, adjusting the pH of the reaction mixture may include adding a sulfuric acid solution with a concentration between 0.1 M and 1 M to the reaction mixture in a dropwise manner while stirring the reaction mixture.

In an exemplary embodiment, obtaining the first precipitate may further include stirring the sulfuric acid solution and the reaction mixture for at least 1 hour responsive to the pH of the reaction mixture adjusted to a value between 3 and 4.

In an exemplary embodiment, washing the first precipitate with the nitric acid solution may include mixing the first precipitate with the nitric acid solution with a concentration of between 4 M and 6 M.

In an exemplary embodiment, washing the first precipitate with the nitric acid solution may include mixing the first precipitate with the nitric acid solution with a ratio of between 1:5 and 1:15 (mass of the first precipitate in grams:total volume of the nitric acid solution and the first precipitate).

In an exemplary embodiment, washing the first precipitate with the nitric acid solution may include mixing the first precipitate with the nitric acid solution by mechanical stirring for 20 minutes to 1 hour.

In an exemplary embodiment, washing the first precipitate with the nitric acid solution may include mixing the first precipitate with the nitric acid solution at a temperature of between 25° C. to 85° C.

In an exemplary embodiment, precipitating silver chloride from the leach liquor may include mixing the supersaturated sodium chloride solution with the leach liquor at room temperature. An exemplary supersaturated sodium chloride solution may include sodium chloride with a molar concentration of between 1 to 2 times a molar concentration of Ag in the leach liquor.

In an exemplary embodiment, leaching the leach liquor out of the copper anode slime may include mixing the copper anode slime with the acid mixture, the acid mixture comprising 1 M of sulfuric acid and 2 M of nitric acid.

In an exemplary embodiment, leaching the leach liquor out of the copper anode slime may include mixing the copper anode slime with the acid mixture by mechanical stirring at 80° C. and 100° C. In an exemplary embodiment, leaching the leach liquor out of the copper anode slime may include mixing the copper anode slime with the acid mixture for 6 to 24 hours.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently preferred embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

Figure 1:
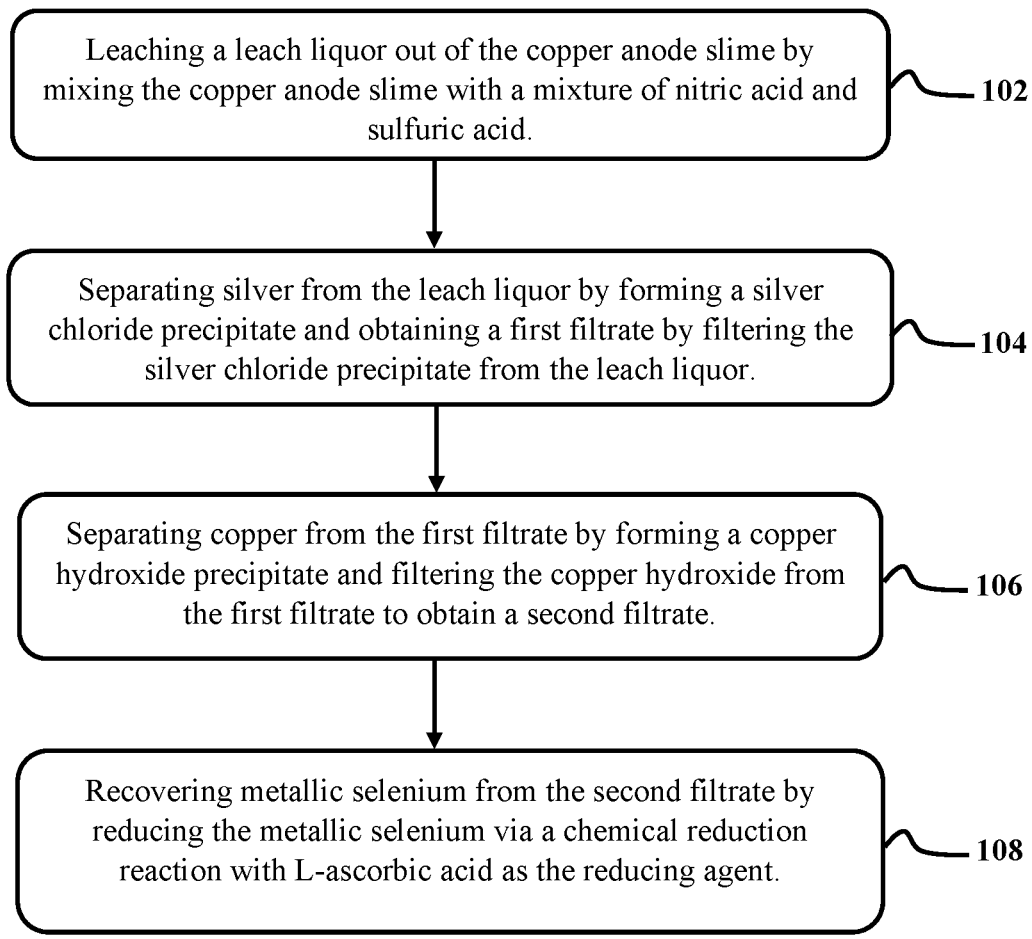
FIG. 1 illustrates a flowchart of a method for recovery of silver, selenium, and copper from copper anode slime, consistent with one or more exemplary embodiments of the present disclosure.

The novel features which are believed to be characteristic of the present disclosure, as to its structure, organization, use and method of operation, together with further objectives and advantages thereof, will be better understood from the following discussion.

The present disclosure is directed to exemplary embodiments of a method for recovery of silver, selenium, and copper from copper anode slime. An exemplary method for recovery of precious metals from an exemplary copper anode slime may include performing an acid leaching on an exemplary copper anode slime to obtain a leach liquor that may be rich in precious metals, such as silver, copper, and selenium and a leach residue that may be rich in gold. An exemplary leach liquor may be separated from an exemplary leach residue by filtration to obtain an exemplary leach liquor as a filtrate.

After obtaining an exemplary leach liquor, sliver may be separated form an exemplary leach liquor by precipitating it as a silver chloride precipitate. To this end, an exemplary sodium chloride solution may be mixed with an exemplary leach liquor. Sodium chloride may react with silver ions present in an exemplary leach liquor according to the following reaction and may form silver chloride, which settles out of an exemplary leach liquor.

$$Ag^+ + NaCl \rightarrow AgCl + Na^+$$

After separating silver from an exemplary leach liquor by precipitating the silver as silver chloride, the precipitated silver chloride may be separated from an exemplary leach liquor by filtration to obtain a first filtrate. Then, copper may be separated from an exemplary first filtrate as a copper hydroxide precipitate. To this end, pH of an exemplary first filtrate may be adjusted to a value of 9 by dropwise addition of a sodium hydroxide solution to an exemplary first filtrate. When pH of an exemplary first filtrate is adjusted to 9 by addition of an exemplary sodium hydroxide solution, copper may settle out of an exemplary first precipitate as a greenish blue copper hydroxide precipitate according to the following reaction:

$$Cu^{2+} + 2NaOH \rightarrow Cu(OH)_2 + 2Na^+$$

After separating copper from an exemplary first filtrate by precipitating the copper as copper hydroxide, the precipitated copper hydroxide may be separated from an exemplary first precipitate by filtration to obtain a second filtrate free of silver and copper. After that, metallic selenium may be recovered from an exemplary second filtrate by performing a chemical reduction process by utilizing L-Ascorbic acid (LAA) as a reducing agent.

An exemplary chemical reduction process for separating metallic selenium from an exemplary second precipitate may include forming a reaction mixture by mixing LAA powder with an exemplary second precipitate in a stirred vessel with pH of the reaction mixture adjusted to a value between 3 and 4. Here, selenium may be reduced as red metallic selenium that may settle out of an exemplary reaction mixture. Then, red metallic selenium may be filtered out and washed with nitric acid to obtain black metallic selenium. Finally, black metallic selenium may be separated by filtration and may be dried to obtain a black metallic selenium powder.

FIG. 1 illustrates a flowchart of a method 100 for recovery of silver, selenium, and copper from copper anode slime, consistent with one or more exemplary embodiments of the present disclosure. In an exemplary embodiment, method 100 may include a step 102 of leaching a leach liquor out of the copper anode slime by mixing the copper anode slime with a mixture of nitric acid and sulfuric acid, a step 104 of separating silver from the leach liquor by forming a silver chloride precipitate and obtaining a first filtrate by filtering the silver chloride precipitate from the leach liquor. In an exemplary embodiment, method 100 may further include a step 106 of separating copper from the first filtrate by forming a copper hydroxide precipitate and obtaining a second filtrate by filtering the copper hydroxide from the first filtrate. In an exemplary embodiment, method 100 may further include a step 108 of recovering metallic selenium from the second filtrate by reducing the metallic selenium via a chemical reduction reaction with L-ascorbic acid as the reducing agent.

In an exemplary embodiment, step 102 of leaching a leach liquor out of the copper anode slime may include mixing the copper anode slime with an acid mixture with a solid to liquid ratio of between 1:5 and 1:20. As used herein, a solid to liquid ratio may be defined as a ratio between mass of copper anode slime in grams (g) and a total volume of a mixture of the copper anode slime and an acid mixture in milliliters (mL). For example, mixing 10 g of copper anode slime with an acid mixture with a solid to liquid ratio of 1:15 may refer to adding the acid mixture to 10 g of the copper anode slime to reach a total volume of 150 mL. In an exemplary embodiment, leaching a leach liquor out of the copper anode slime may be carried out by tank leaching, where the copper anode slime in the form of a slurry may be mixed with an acid mixture in a stirred leaching tank. An exemplary stirred leaching tank may include a mechanical agitator or mixer that is configured to mix a copper anode slime and an acid mixture to allow for copper, silver, and selenium to be leached out of the copper anode slime into a solution phase, which is referred to herein as leach liquor.

In an exemplary embodiment, step 102 of leaching the leach liquor out of the copper anode slime may include mixing the copper anode slime with the acid mixture in a stirred leaching tank with a mechanical agitator rotating at a rotational speed of 100 rpm to 400 rpm. In an exemplary embodiment, the stirred leaching tank may be a stainless-steel tank with a chrome lining that may be equipped with heating coils to adjust the temperature of the stirred vessel. In an exemplary embodiment, step 102 of leaching the leach liquor out of the copper anode slime may include mixing the copper anode slime with the acid mixture in the stirred vessel at a temperature of between 80° C. and 100° C. for a period of between 6 hours and 24 hours.

In an exemplary embodiment, an exemplary acid mixture may include an aqueous mixture of sulfuric acid with a molar concentration of 1 M and nitric acid with a molar concentration of 2 M. In an exemplary embodiment, an exemplary acid mixture may be utilized as a leaching solution in step 102 of leaching the leach liquor out of the copper anode slime, where copper, silver, and selenium may be leached out of an exemplary copper anode slime into an exemplary leach liquor. In an exemplary embodiment, gold, as another valuable metal in an exemplary copper anode slime may remain in leach residue.

In an exemplary embodiment, leach residue, which is a solid phase remaining in an exemplary leach tank after leaching is over, may be separated from leach liquor by filtration. In an exemplary embodiment, leach residue and leach liquor may be separated by passing the mixture of leach residue and leach liquor through a filter, where leach liquor may pass through the filter and may be separated as a filtrate. In an exemplary embodiment, various types of filters may be utilized for separating an exemplary leach liquor, for example, a filter press or a vacuum filter. In an exemplary embodiment, a mixture of leach residue and leach liquor may be forced through a filtration medium, where leach liquor may pass through the filtration medium.

In an exemplary embodiment, step 104 of separating silver from the leach liquor may include mixing a supersaturated solution of sodium chloride with the leach liquor at room temperature. In an exemplary embodiment, a supersaturated solution of sodium chloride may include sodium chloride with a molar concentration of between 1 to 2 times a molar concentration of $Ag^+$ ions in the leach liquor. In an exemplary embodiment, the amount of $Ag^+$ ions within an exemplary copper anode slime may be measured by analytical methods, such as inductively coupled mass spectroscopy (ICP) and then based on the amount of $Ag^+$ ions within an exemplary copper anode slime, the required amount of sodium chloride for preparation of a supersaturated solution of sodium chloride may be obtained. For example, for each one mole of $Ag^+$ ions present in an exemplary copper anode slime, 1 to 2 moles of sodium chloride may be required to ensure a complete precipitation of $Ag^+$ ions.

In an exemplary embodiment, sodium chloride with an amount calculated as was described in the preceding paragraph may be mixed with water to produce a supersaturated solution of sodium chloride. In an exemplary embodiment, an exemplary supersaturated solution of sodium chloride may have a concentration of between 300 to 400 $gL^{-1}$.

In an exemplary embodiment, mixing an exemplary supersaturated solution of sodium chloride with an exemplary leach liquor at room temperature may include adding an exemplary supersaturated solution of sodium chloride to an exemplary leach liquor within a stirred vessel and then utilizing a mechanical agitator to mix an exemplary supersaturated solution of sodium chloride and an exemplary leach liquor for 1 to 3 hours. In an exemplary embodiment, a silver chloride precipitate may form within the stirred vessel.

In an exemplary embodiment, step 104 of separating silver from the leach liquor may further include filtering the silver chloride precipitate from the leach liquor. In an exemplary embodiment, when silver chloride precipitate is formed within the stirred vessel as was described in the preceding paragraph, contents of the stirred vessel may be forced through a filter medium, where silver chloride precipitate may be separated by the filter medium, while the first filtrate may pass through the filter medium. In an exemplary embodiment, an exemplary filter medium may be utilized in a filter press or a vacuum filter. In an exemplary embodiment, the first filtrate may still include precious materials, such as copper and selenium that need to be further extracted.

In an exemplary embodiment, step 106 may involve separating copper from the first filtrate obtained from step 104. In an exemplary embodiment, separating copper from the first filtrate may include forming a copper hydroxide precipitate in the first filtrate by adjusting pH of the first filtrate to 9. In an exemplary embodiment, adjusting the pH of the first filtrate may include dropwise addition of a sodium hydroxide solution to the first filtrate in a stirred vessel. To this end, while the first filtrate is being stirred in a stirred vessel, a sodium hydroxide solution with a molar concentration of between 0.1 M and 1M may be added in a dropwise manner. For example, droplets of sodium hydroxide may be added to the first filtrate with a time interval of approximately 5 seconds between the droplets. Simultaneously, pH of the first filtrate may be monitored and dropwise addition of sodium hydroxide may be carried out to the point where pH of the first filtrate equals 9. In an exemplary embodiment, after adjustment of pH at 9, the first filtrate may be further stirred for at least one more hour to allow for copper to settle out of the first filtrate as a greenish blue copper hydroxide precipitate.

In an exemplary embodiment, step 106 may further include obtaining a copper-free second filtrate by filtering the formed copper hydroxide precipitate from the first filtrate. To this end, the formed copper hydroxide precipitate along with the remaining solution of the first filtrate may be forced to pass through a filter medium, where the formed copper hydroxide precipitate may remain behind the filter medium, while the second filtrate may pass through the filter medium. In an exemplary embodiment, the second filtrate may still include precious metals, such as selenium that needs to be further recovered from the second filtrate.

In an exemplary embodiment, step 108 of recovering metallic selenium from the second precipitate may include reducing the metallic selenium via a chemical reduction reaction with L-ascorbic acid (LAA) as the reducing agent.

Figure 2:
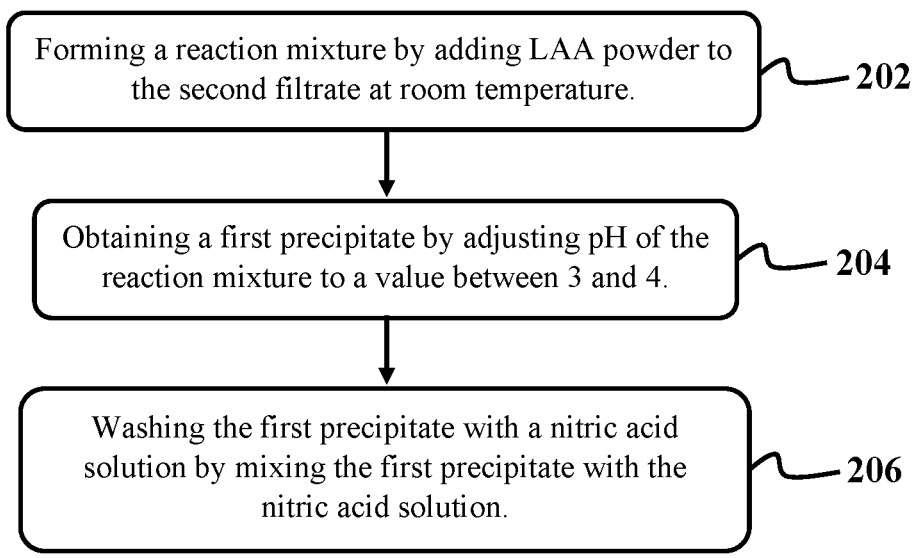
FIG. 2 illustrates a flowchart of a method for recovering metallic selenium from the second precipitate, consistent with one or more exemplary embodiments of the present disclosure.

FIG. 2 illustrates a flowchart of a method for performing step 108 of recovering metallic selenium from the second filtrate, consistent with one or more exemplary embodiments of the present disclosure. In an exemplary embodiment, step 108 may include a step 202 of forming a reaction mixture by adding LAA powder to the second filtrate at room temperature, a step 204 of obtaining a first precipitate by adjusting pH of the reaction mixture to a value between 3 and 4, and a step 206 of washing the first precipitate with a nitric acid solution by mixing the first precipitate with the nitric acid solution.

In an exemplary embodiment, step 202 of forming the reaction mixture comprises adding a predetermined amount of an LAA powder to the second filtrate. In an exemplary embodiment, the predetermined amount of the LLA powder may be equal to 1.5 to 2 times a mass of selenium in the leach liquor. In an exemplary embodiment, the mass of selenium within an exemplary leach liquor may be measured by analytical methods, such as ICP and then based on the mass of selenium in the leach liquor, the predetermined amount of the LLA powder may be obtained. In an exemplary embodiment, adding a predetermined amount of an LAA powder to the second filtrate may include mixing the predetermined amount of LAA powder and the second filtrate in a stirred vessel.

In an exemplary embodiment, step 204 of obtaining the first precipitate may include adjusting pH of the reaction mixture to a value between 3 and 4. In an exemplary embodiment, adjusting the pH of the reaction mixture may include dropwise addition of a sulfuric acid solution to the reaction mixture, while the reaction mixture is being mixed in the stirred vessel. For example, a sulfuric acid solution with a concentration of between 0.1 M and 1M may be added drop by drop to the reaction mixture while simultaneously monitoring pH of the reaction mixture. Such dropwise addition of sulfuric acid to the reaction mixture continues to the point where the pH of the reaction mixture is adjusted to a value between 3 and 4. In an exemplary embodiment, after the pH of the reaction mixture is adjusted to a value between 3 and 4, the reaction mixture may be stirred for at least one more hour to ensure that red metallic selenium may be reduced and precipitated from the reaction mixture as the first precipitate.

In an exemplary embodiment, step 206 of washing the first precipitate with a nitric acid solution may include mixing the first precipitate with the nitric acid solution in a stirred vessel. In an exemplary embodiment, the nitric acid solution may be a nitric acid solution with a concentration of between 4 M and 6 M. In an exemplary embodiment, washing the first precipitate with the nitric acid solution may include mixing the first precipitate with the nitric acid solution with a ratio of between 1:5 and 1:15 (mass of the first precipitate in grams:total volume of the nitric acid solution and the first precipitate). In an exemplary embodiment, washing the first precipitate with the nitric acid solution may include mixing the first precipitate with the nitric acid solution for 20 minutes to 1 hour at a temperature of between 25° C. to 85° C. In an exemplary embodiment, washing the first precipitate with a nitric acid solution may lead to the production of black metallic selenium, which may later be separated by filtration and may be dried as a black metallic selenium powder.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A method for recovery of precious metals from copper anode slime, the method comprising:
  leaching a leach liquor out of the copper anode slime by mixing the copper anode slime with an acid mixture with a ratio of between 1:5 and 1:20 (mass of anode slime in grams:total volume of a mixture of the copper anode slime and the acid mixture in milliliters), the acid mixture comprising nitric acid and sulfuric acid;
  separating silver from the leach liquor by:
    forming a silver chloride precipitate in the leach liquor by mixing a supersaturated sodium chloride solution with the leach liquor at room temperature; and
    obtaining a first filtrate by filtering the silver chloride precipitate out of the leach liquor;
  separating copper from the first filtrate by:

forming a copper hydroxide precipitate in the first filtrate by adjusting pH of the first filtrate to 9, the adjusting the pH of the first filtrate comprising adding a sodium hydroxide solution to the first filtrate in a dropwise manner at room temperature; and obtaining a second filtrate by filtering the copper hydroxide precipitate out of the first filtrate; and recovering metallic selenium from the second filtrate by:

forming a reaction mixture by adding L-ascorbic acid (LAA) powder to the second filtrate at room temperature;

obtaining a first precipitate by adjusting pH of the reaction mixture to a value between 3 and 4, the adjusting the pH of the reaction mixture comprising adding a sulfuric acid solution to the reaction mixture in a dropwise manner while stirring the reaction mixture; and washing the first precipitate with a nitric acid solution by mixing the first precipitate with the nitric acid solution.

2. The method of claim 1, wherein adjusting the pH of the first filtrate comprises adding a sodium hydroxide solution with a concentration between 0.1 M and 1 M to the first filtrate in a dropwise manner while stirring the first filtrate.

3. The method of claim 2, wherein forming the copper hydroxide precipitate in the first filtrate further comprises stirring the sodium hydroxide solution with the first filtrate for at least 1 hour.

4. The method of claim 2, wherein forming the reaction mixture comprises adding L-ascorbic acid (LAA) powder to the second filtrate with an amount of the LAA powder equal to 1.5 to 2 times a mass of selenium in the leach liquor.

5. The method of claim 4, wherein adjusting the pH of the reaction mixture comprises adding a sulfuric acid solution with a concentration between 0.1 M and 1 M to the reaction mixture in a dropwise manner while stirring the reaction mixture.

6. The method of claim 5, wherein obtaining the first precipitate further comprises stirring the sulfuric acid solution and the reaction mixture for at least 1 hour.

7. The method of claim 6, wherein obtaining the first precipitate further comprises filtering the first precipitate out of the reaction mixture.

8. The method of claim 5, wherein washing the first precipitate with the nitric acid solution comprises mixing the first precipitate with the nitric acid solution, wherein concentration of the nitric acid solution is between 4 M and 6 M.

9. The method of claim 8, wherein washing the first precipitate with the nitric acid solution comprises mixing the first precipitate with the nitric acid solution with a ratio of between 1:5 and 1:15 (mass of the first precipitate in grams:total volume of the nitric acid solution and the first precipitate in milliliters).

10. The method of claim 9, wherein washing the first precipitate with the nitric acid solution comprises mixing the first precipitate with the nitric acid solution by mechanical stirring for 20 minutes to 1 hour.

11. The method of claim 10, wherein washing the first precipitate with the nitric acid solution comprises mixing the first precipitate with the nitric acid solution at a temperature of between 25° C. and 85° C.

12. The method of claim 10, wherein precipitating silver chloride from the leach liquor comprises mixing the supersaturated sodium chloride solution with the leach liquor at room temperature, the supersaturated sodium chloride solution comprising sodium chloride with a molar concentration of between 1 to 2 times a molar concentration of Ag in the leach liquor.

13. The method of claim 12, wherein leaching the leach liquor out of the copper anode slime comprises mixing the copper anode slime with the acid mixture, the acid mixture comprising 1 M of sulfuric acid and 2 M of nitric acid.

14. The method of claim 13, wherein leaching the leach liquor out of the copper anode slime comprises mixing the copper anode slime with the acid mixture by mechanical stirring at 80° C. and 100° C.

15. The method of claim 14, wherein leaching the leach liquor out of the copper anode slime comprises mixing the copper anode slime with the acid mixture for 6 to 24 hours.

* * * * *